United States Patent
Han et al.

(10) Patent No.: US 11,211,079 B2
(45) Date of Patent: Dec. 28, 2021

(54) ARTIFICIAL INTELLIGENCE DEVICE WITH A VOICE RECOGNITION

(71) Applicant: LG ELECTRONICS INC., Seoul (KR)

(72) Inventors: Jongwoo Han, Seoul (KR); Jaehong Kim, Seoul (KR); Hyoeun Kim, Seoul (KR); Taeho Lee, Seoul (KR); Hangil Jeong, Seoul (KR); Heeyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 16/657,137

(22) Filed: Oct. 18, 2019

(65) Prior Publication Data

US 2020/0051571 A1 Feb. 13, 2020

(30) Foreign Application Priority Data

Sep. 20, 2019 (KR) .................. 10-2019-0116068

(51) Int. Cl.
| | | |
|---|---|---|
| *G10L 21/0208* | (2013.01) | |
| *G10L 17/02* | (2013.01) | |
| *G10L 17/18* | (2013.01) | |
| *G10L 17/04* | (2013.01) | |
| *G10L 15/02* | (2006.01) | |

(52) U.S. Cl.
CPC .......... *G10L 21/0208* (2013.01); *G10L 15/02* (2013.01); *G10L 17/02* (2013.01); *G10L 17/04* (2013.01); *G10L 17/18* (2013.01)

(58) Field of Classification Search
CPC .................. G10L 15/20; G10L 17/20
See application file for complete search history.

(56) References Cited

U.S. PATENT DOCUMENTS

| | | | | |
|---|---|---|---|---|
| 5,768,473 A * | 6/1998 | Eatwell | .............. | G10L 21/0208 381/94.1 |
| 7,555,075 B2 * | 6/2009 | Pessoa | ................ | G10L 21/0208 375/285 |
| 9,443,503 B2 * | 9/2016 | Sugiyama | .............. | G10K 11/16 |
| 9,837,097 B2 * | 12/2017 | Sugiyama | ........... | G10L 21/0208 |
| 9,875,755 B2 * | 1/2018 | Nakadai | .............. | G10L 21/0232 |
| 10,034,088 B2 * | 7/2018 | Osako | .................... | H04R 3/005 |
| 10,176,795 B2 * | 1/2019 | Christoph | ........ | G10K 11/17817 |
| 2005/0143989 A1 * | 6/2005 | Jelinek | ................ | G10L 21/0208 704/226 |

(Continued)

FOREIGN PATENT DOCUMENTS

| | | |
|---|---|---|
| KR | 10-2019-0018282 A | 2/2019 |
| KR | 10-2019-0096305 A | 6/2019 |

*Primary Examiner* — Douglas Godbold
(74) *Attorney, Agent, or Firm* — Birch, Stewart, Kolasch & Birch, LLP

(57) ABSTRACT

An AI device is provided. The AI device includes a memory to store data, a voice acquisition interface to acquire a voice signal, and a processor to perform preprocessing for the voice signal based on a parameter, to provide the preprocessed voice signal to a voice recognition model, to acquire a voice recognition result, to store a characteristic of the preprocessed voice signal in the memory, and to change the parameter using a distribution of characteristics of voice signals accumulated in the memory.

9 Claims, 8 Drawing Sheets

(56) References Cited

U.S. PATENT DOCUMENTS

| | | | |
|---|---|---|---|
| 2006/0122832 A1* | 6/2006 | Takiguchi | G10L 21/0208 704/240 |
| 2013/0231929 A1* | 9/2013 | Komeji | G10L 15/20 704/233 |
| 2013/0297303 A1* | 11/2013 | Arakawa | G10L 21/0208 704/227 |
| 2014/0177868 A1* | 6/2014 | Jensen | G10L 21/0208 381/94.7 |
| 2016/0125876 A1* | 5/2016 | Schroeter | G10L 25/72 704/226 |
| 2018/0033428 A1* | 2/2018 | Kim | G10L 15/22 |
| 2019/0051288 A1 | 2/2019 | Lee et al. | |
| 2019/0208317 A1* | 7/2019 | Woodruff | G10L 21/028 |
| 2020/0036233 A1 | 1/2020 | Lee | |
| 2020/0075038 A1* | 3/2020 | Sung | H04B 1/40 |

* cited by examiner (a)

(b)

ARTIFICIAL INTELLIGENCE DEVICE WITH A VOICE RECOGNITION

CROSS-REFERENCE TO RELATED APPLICATIONS

This application claims priority under 35 U.S.C. 119 and 365 to Korean Patent Application No. 10-2019-0116068, filed on Sep. 20, 2019 in the Korean Intellectual Property Office, the disclosure of which is incorporated herein by reference.

FIELD

The present disclosure relates to an artificial intelligence device capable of updating a parameter used for performing preprocessing for a voice signal by using the characteristic of the voice signal.

BACKGROUND

Artificial Intelligence, which is one field in a computer science and an information technology to study and research a manner allowing a computer to perform thinking, learning, or self-developing based on human intelligence, refers to allow the computer to emulate the intelligent behavior of a human being.

In addition, the artificial intelligence does not exist in itself, but is directly/indirectly significantly associated with other fields of a computer science. Especially, currently, artificial intelligence elements have introduced into several fields of the information technology, and have been actively attempted to be utilized in solving problems in relevant fields.

Meanwhile, technologies have been actively studied and researched to perceive and learn the surrounding situation using Artificial Intelligence, to provide information desired by the user in a desired form, or to perform an operation or function desired by the user.

In addition, an electronic device to provide such various operations and functions may be named an Artificial intelligence (AI) device.

The AI device provides a voice signal of the human being to a voice recognition model, which is previously trained, and acquires the recognition result of the voice signal.

Meanwhile, an author of the voice recognition model assumes the use environment by the user and trains the voice recognition model by using training data matched with the assumed use environment.

In addition, the voice recognition model shows the superior performance when the voice signal matched with the assumed use environment is input, but shows inferior performance when the voice signal not matched with the assumed use environment is input.

SUMMARY

The present disclosure is provided to solve the problems, and an aspect of the present disclosure is to provide an AI device capable of updating a parameter used in preprocessing a voice signal using the characteristic of the voice signal.

According to an embodiment of the present disclosure, an AI device includes a memory to store data, a voice acquisition device to acquire a voice signal, and a processor to perform preprocessing for the voice signal based on a parameter, to provide the preprocessed voice signal to a voice recognition model, to acquire a voice recognition result, to store a characteristic of the preprocessed voice signal in the memory, and to change the parameter using a distribution of characteristics of voice signals accumulated in the memory.

DETAILED DESCRIPTION

Figure 1:
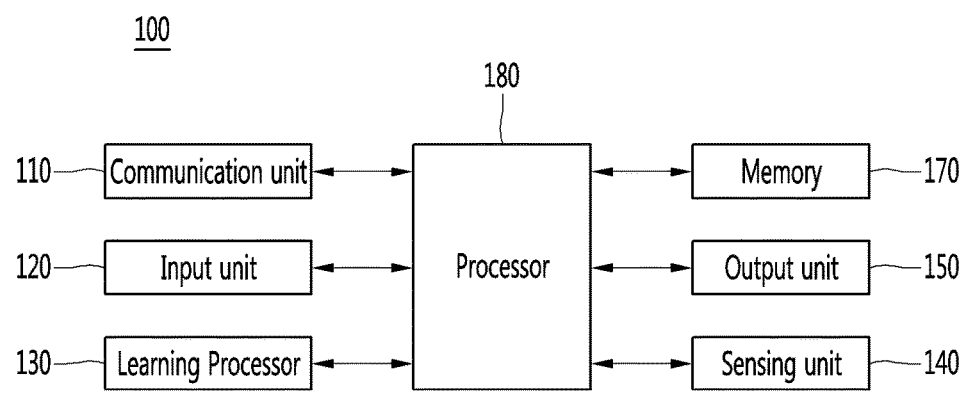
FIG. 1 illustrates an AI device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, or user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
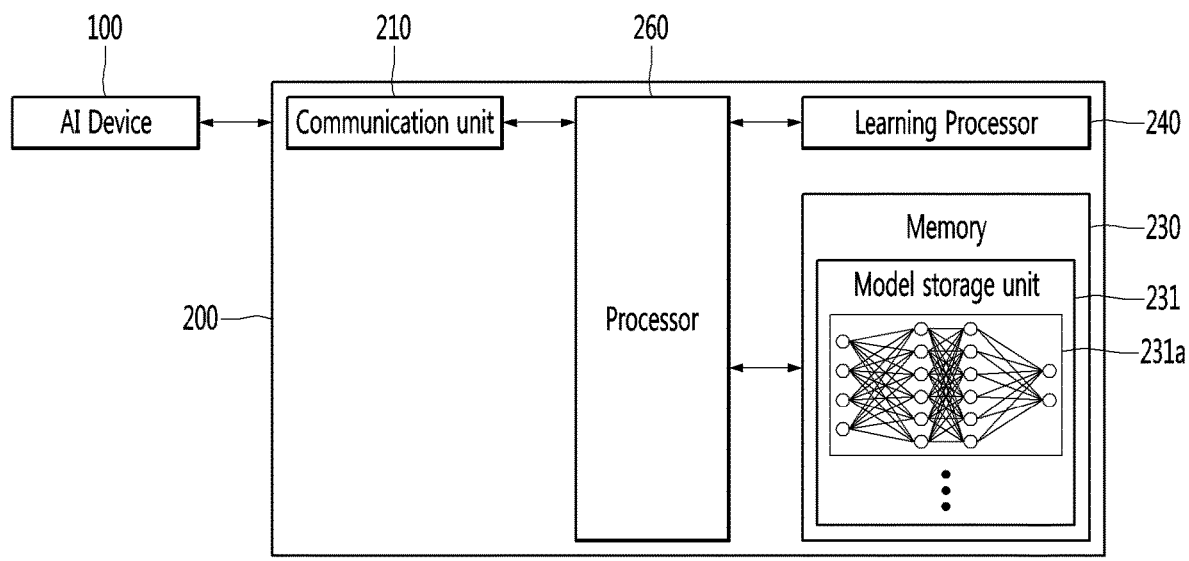
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
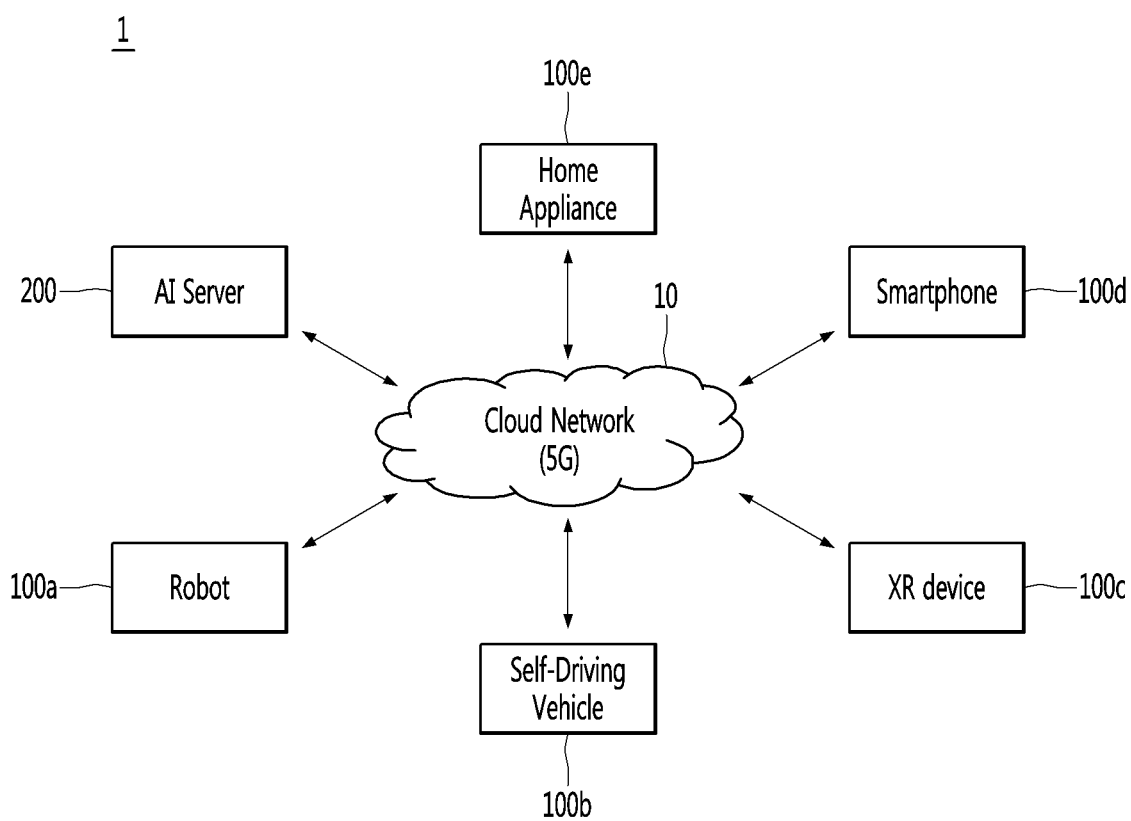
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

AI+Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

AI+XR

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

AI+Robot+Self-Driving

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Meanwhile, in the following description, an AI server 200 may include the feature of the AI device 100 described with reference to FIGS. 1 to 3 and may perform the function of the AI device 100.

In addition, in the following description, an electronic device 300 may include the feature of the AI device 100 described with reference to FIGS. 1 to 3 and may perform the function of the AI device 100.

Meanwhile, the AI device described herein may be the AI server 200 or the electronic device 300.

The following description will be made on the assumption that the AI device is the AI server 200.

Figure 4:
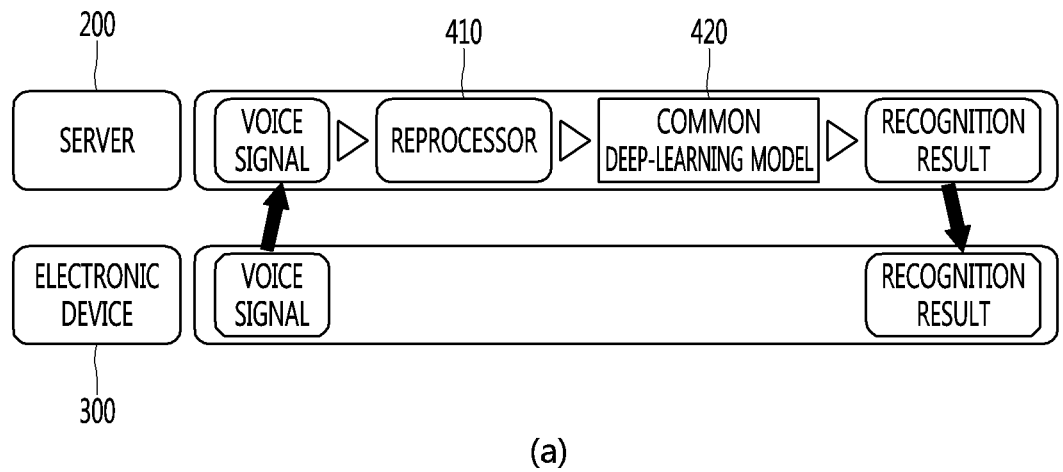
FIG. 4 is a view illustrating a problem occurring in the prior art.
Figure 4:
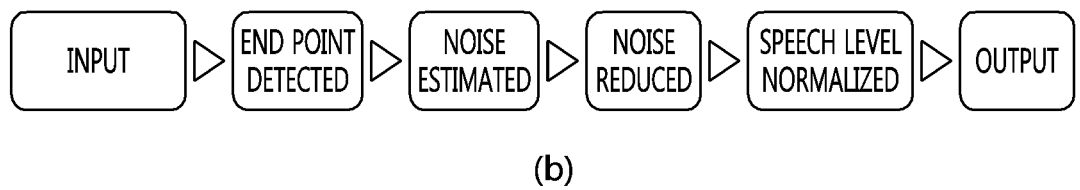

FIG. 4 is a view illustrating a problem occurring in the prior art.

An AI system according to the embodiment of the present disclosure may include the AI server 200 and the electronic device 300.

The electronic device 300 may communicate with the AI server 200.

In detail, the electronic device 300 may include a communication device, and the communication device may provide an interface for connecting an electronic device to a wired/wireless network including an internet network. The communication device may transmit or receive data with the server through the connected network or another network linked to the connected network.

Meanwhile, the electronic device 300 may perform a function corresponding to the received voice signal.

In detail, the electronic device 300 may receive a voice signal and transmit the voice signal to the AI server 200. In this case, the AI server 200 includes a preprocessor 410, performs preprocessing for the voice signal, inputs the preprocessed voice signal to a voice recognition model (common deep learning model) 420, acquires a voice recognition result, and transmits the acquired voice recognition result to the electronic device 300. In this case, the electronic device 300 may generate a control command corresponding to the voice recognition result to perform the control or may output the recognition result.

Meanwhile, the AI server 200 acquires a recognition result by preprocessing the voice signal of the user and then providing the voice signal to the previously trained voice recognition model 420.

In this case, the preprocessing, which is to improve voice recognition performance of the voice recognition model, may include at least one of an operation of lowering the level of a noise signal by an attenuation amount or adjusting the level of a speech signal to a normalization value.

In detail, the AI server 200 may perform end-point detection (EPD) to detect the end point of utterance when the voice signal is acquired, and may perform noise estimation to measure the level of a signal at the point where no utterance is spoken to detect the noise level. In addition, the AI server 200 may perform noise reduction to adaptively reduce noise according to the level noise, and may perform speech level normalization that makes the average value of a speech level constant When the preprocessing is completed, the AI server 200 may input the preprocessed voice signal into the voice recognition model 420.

Meanwhile, the AI server 200 may perform the preprocessing for a voice signal based on a parameter. In this case, the parameter may include an attenuation amount for reducing noise based on the level of the noise and a normalization value referring to a target value to be obtained by normalizing the voice signal.

Meanwhile, the attenuation amount of the noise signal and the normalization value of the voice signal are constant regardless of the use environment of the electronic device.

In detail, an author of the voice recognition model assumes the use environment by the user and trains the voice recognition model by using training data matched with the assumed use environment. The author of the voice recognition model determines the parameters (the attenuation amount of the noise signal and the normalization value of the speech signal), based on the characteristic (the level of the noise signal or the level of the speech signal) of the training data used for training the voice recognition model.

Meanwhile, the voice recognition model shows the superior performance when the voice signal matched with the assumed use environment is input, but shows inferior performance when the voice signal not matched with the assumed use environment is input.

For example, even though a voice signal is received with the characteristic different from the characteristic (the level of the noise signal or the level of the speech signal) used for training the voice recognition model, if the voice signal is preprocessed using the parameter determined based on the characteristic of the training data used for training the voice recognition model, the performance of the voice recognition model may be deteriorated.

Figure 5:
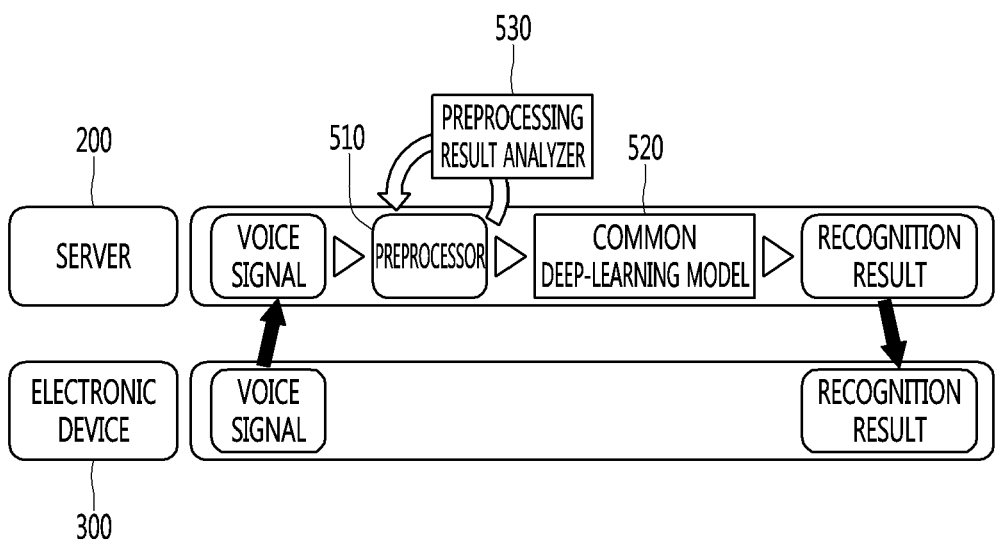
FIG. 5 is a view illustrating the AI server according to an embodiment of the present disclosure.

FIG. 5 is a view illustrating the AI server 200 according to an embodiment of the present disclosure.

All the description of the prior art made with reference to FIG. 4 will be applied to the AI server 200 according to an embodiment of the present disclosure.

In addition, according to an embodiment of the present disclosure, the AI server 200 may include a preprocessing result analyzer 530.

In this case, the preprocessing result analyzer 530 may change parameters set in the preprocessor by using the distribution of characteristics of voice signals accumulated in the memory.

Meanwhile, the preprocessing result analyzer 530 may be one component of the processor, and the operation performed by the preprocessing result analyzer 530 may be an operation performed by the processor.

Figure 6:
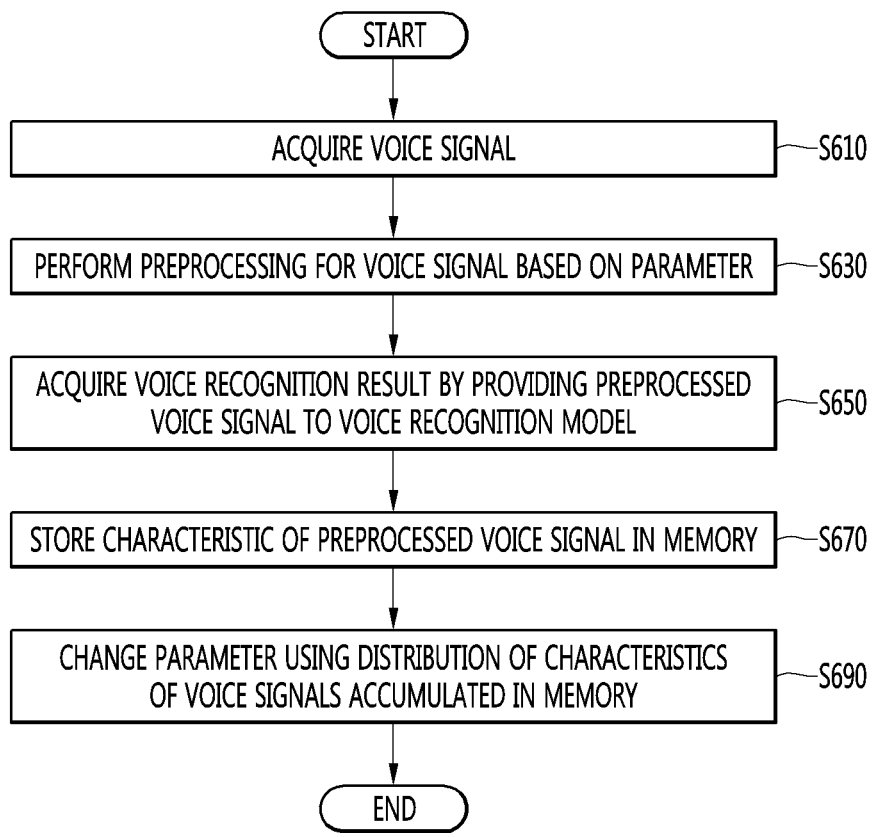
FIG. 6 is a flowchart illustrating the operating method of the AI server according to an embodiment of the present disclosure.

FIG. 6 is a flowchart illustrating the operating method of the AI server 200 according to an embodiment of the present disclosure.

According to an embodiment of the present disclosure, the operating method of the AI server 200 may include the steps of acquiring a voice signal (S610), performing preprocessing for the voice signal based on a parameter (S630), acquiring a voice recognition result by providing the preprocessed voice signal to the voice recognition model (S650), storing the characteristic of the preprocessed voice signal in the memory (S670), and changing the parameter using the distribution of characteristics of voice signals accumulated in the memory (S690).

First, the step of acquiring the voice signal (S610) will be described below.

The AI server 200 may acquire the voice signal through a voice acquisition device.

In detail, the voice acquisition device may include the communication unit 110 described with reference to FIG. 1. In this case, the voice acquisition device may include a communication circuit to communicate with the electronic device 300.

Meanwhile, the electronic device 300 may receive a voice signal through the input unit of the electronic device 300 and transmit the received voice signal to the AI server 200.

Meanwhile, the processor of the AI server 200 may receive the voice signal from the electronic device 300.

Next, the step of performing preprocessing for the voice signal based on a parameter (S630) will be described below.

The processor of the AI server 200 may perform preprocessing for the voice signal based on the parameter.

In detail, the voice signal may include a speech signal representing the utterance of the user and a noise signal representing noise other than the utterance of the user.

The parameter may include at least one of an attenuation amount of noise in the voice signal or a normalization value of the speech signal in the voice signal.

In addition, the processor of the AI server 200 may perform at least one of an operation of lowering the level of a noise signal by an attenuation amount or an operation of adjusting the level of a speech signal to a normalization value, based on the parameter.

In more detail, the processor of the AI server 200 may perform end-point detection (EPD) to detect an end point of the utterance using the voice signal.

In addition, the processor of the AI server 200 may measure the level of a signal at the point where no utterance is spoken.

In addition, the processor of the AI server 200 may perform noise reduction to adaptively reduce noise according to the level of noise. In this case, the processor of the AI server 200 may lower the level of the noise signal by the attenuation amount included in the parameter.

In addition, the processor of the AI server 200 may perform speech level normalization that makes the average value of a speech level constant. In this case, the processor of the AI server 200 may adjust the level of a speech signal to a normalization value included in the parameter.

Next, the step of acquiring a voice recognition result by providing the preprocessed voice signal to the voice recognition model (S650) will be described below.

The processor of the AI server 200 may acquire a voice recognition result by providing the preprocessed voice signal to the voice recognition model.

In detail, the voice recognition model may be installed in the AI server 200.

In more detail, the voice recognition refers to converting the voice signal into a character string or identifying information of a linguistic meaning, by analyzing the voice signal and combining the analyzed voice signal with a database having a pattern.

The voice recognition technology is to analyze the received voice data by the voice recognition model, extract features, measure the similarity of the features and the previously collected voice model database, and convert the most similar feature into a text or command.

In addition, when the voice input by the user is input into the voice recognition model, the voice recognition model may output a recognition result for the input voice.

Meanwhile, the voice recognition model may perform a speech recognition function. In detail, the voice recognition model may extract language information included in the input voice and may change the extracted language information to text information.

In addition, the voice recognition model may perform a speech understanding function. In more detail, the voice recognition model may determine the language information meant by text information by detecting the syntax structure of the text information.

In addition, the voice recognition model may output an intention corresponding to the input voice.

In detail, the voice recognition model may acquire the intention corresponding to the input voice by using at least one of a speech to text (SIT) engine to convert the input speech into a character string or a natural language processing (NLP) engine to acquire the intention of a natural language.

The method and the operation of generating the voice recognition model are generally known to those skilled in the art and the details thereof will be omitted.

Next, the step of storing the characteristic of the preprocessed voice signal in the memory (S670) will be described below.

The processor of the AI server 200 may store the characteristic of the preprocessed voice signal into the memory. In this case, the characteristic of the preprocessed voice signal may include the level a noise signal in the preprocessed voice signal and the level of a speech signal in the preprocessed voice signal.

Figure 7:
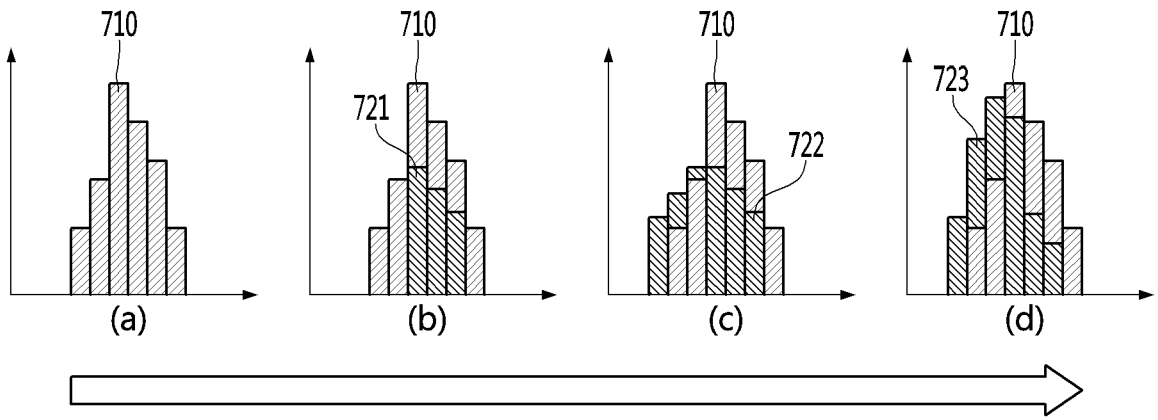
FIG. 7 is a view illustrating the procedure of accumulating characteristics of the voice signals, according to an embodiment of the present disclosure.

FIG. 7 is a view illustrating the procedure accumulating characteristics of the voice signals, according to an embodiment of the present disclosure.

In the histogram of FIG. 7, an X axis represents the level of the noise signal or the level of the speech signal. In addition, in the histogram of FIG. 7, a Y axis represents a result obtained by counting the level of the noise signal in the preprocessed voice signal or the level of the speech signal in the preprocessed voice signal.

Steps S610 to S670 may be repeatedly performed and thus the characteristics of the voice signals may be accumulated in the memory.

For example, when a first voice signal is received, the processor may perform preprocessing for the first voice signal, provide the first voice signal, which is preprocessed, to the voice recognition model to obtain the voice recognition result, and to store the characteristic (the level of the noise signal in the first voice signal preprocessed and the level of the speech signal in the first voice signal preprocessed) of the first voice signal, which is preprocessed, in the memory.

In addition, when a $n^{th}$ voice signal is received, the processor may perform preprocessing for the $n^{th}$ voice signal, provide the $n^{th}$ voice signal, which is preprocessed, to the voice recognition model to obtain the voice recognition result, and store the characteristic (the level of the noise signal in the nth voice signal preprocessed and the level of the speech signal in the nth voice signal preprocessed) of the $n^{th}$ voice signal, which is preprocessed, in the memory.

In other words, when preprocessing is performed voice signals from the first voice signal to the $n^{th}$ voice signal, characteristics of n voice signals may be stored in the memory.

In other words, the characteristics of the voice signals accumulated in the memory may include at least one of levels of noise signals in the voice signals preprocessed based on a parameter or levels of speech signals in the voice signals preprocessed based on the parameter.

FIG. 7 is a view illustrating the procedure of accumulating the characteristics of the voice signals. In other words, it may be recognized that characteristics 721, 722, and 723 of voice signals accumulate in the memory from the left histogram toward the right histogram.

Meanwhile, the processor of the AI server 200 may change the parameter using the distribution of characteristics of the voice signals accumulated in the memory.

In detail, the processor of the AI server 200 may acquire at least one of the distribution of the levels of noise signals accumulated in the memory or the distribution of the levels of speech signals accumulated in the memory.

Meanwhile, when the characteristics of the voice signals are accumulated in a specific amount or more, the tendency of the voice signals received from the electronic device 300 may be accurately determined. In other words, when the characteristics of the voice signals are accumulated in a specific amount or more, the characteristics may be used as reliable data.

Accordingly, when preprocessing is performed the specific number of times or more, the processor may acquire the distribution of characteristics of the voice signals accumulated in the memory.

For example, when preprocessing is performed 20 times or more, the processor of the AI server 200 may acquire the distribution of characteristics of the voice signals, which are accumulated in the memory, by using the characteristics of 20 voice signals accumulated in the memory.

The processor may change the parameter by using a distribution 723 and a preset distribution 710 of characteristics of voice signals accumulated in the memory.

Meanwhile, the distribution comparison using histogram illustrated in FIG. 7 is provided only for the illustrative purpose, and the distribution 723 and the preset distribution 710 of the characteristics of the voice signals accumulated in the memory may be compared to each other through various distribution comparison methods.

For example, the difference (distance) between the distribution 723 and the preset distribution 710 of the characteristics of the speech signals accumulated in the memory may be calculated through various distance measuring manners such as KL-Divergence, Jensen-Shannon distance, Mahalanobis distance, Bhattacharyya distance, earth mover distance, and the like.

Meanwhile, the preset distribution may be a distribution of characteristics of training voice signals used for training a voice recognition model.

In more detail, the voice recognition model may be trained by training voice signals and language information labeled on the training voice signals. In addition, the preset distribution may be the distribution of characteristics of the training voice signals used for training.

In addition, the distribution of characteristics of the training voice signals used for training the voice recognition model may include at least one of the distribution of levels of noise signals in the training voice signals used for training the voice recognition model or the distribution of levels of speech signals in the training voice signals used for training the voice recognition model.

The processor of the AI server 200 may perform at least one of an operation of changing the attenuation amount of a noise signal or an operation of changing the normalization value of a speech signal by using the distribution of the characteristics of the voice signals accumulated in the memory and the distribution of characteristics of the training voice signals used for training the voice recognition model.

In detail, the processor of the AI server 200 may perform the operation of changing the attenuation amount of the noise signal by using the distribution of levels of noise signals in voice signals accumulated in the memory and the distribution of levels of noise signals in training voice signals used for training the voice recognition model.

In addition, the processor of the AI server 200 may perform the operation of changing the normalization value of the speech signal by using the distribution of levels of speech signals in voice signals accumulated in the memory and the distribution of levels of speech signals in training voice signals used for training the voice recognition model.

In addition, the processor of the AI server 200 may perform the operation of changing the attenuation amount of the noise signal by using the distribution of levels of noise signals in voice signals accumulated in the memory and the distribution of levels of noise signals in training voice signals used for training the voice recognition model and may perform the operation of changing the normalization value of the speech signal by using the distribution of levels of speech signals in voice signals accumulated in the memory and the distribution of levels of speech signals in training voice signals used for training the voice recognition model.

In this case, the processor may change the parameter to reduce the difference between the distribution of the characteristics of the voice signals accumulated in the memory and the distribution of characteristics of the training voice signals.

In detail, the processor of the AI server 200 may perform the operation of changing the attenuation amount of the noise signal to reduce the difference between the distribution of levels of noise signals in voice signals accumulated in the memory and the distribution of levels of noise signals in the training voice signals used for training the voice recognition model.

In addition, the processor of the AI server 200 may perform the operation of changing the normalization value of the speech signal to reduce the difference between the distribution of levels of speech signals in voice signals accumulated in the memory and the distribution of levels of speech signals in the training voice signals used for training the voice recognition model.

In addition, the processor of the AI server 200 may perform the operation of changing the attenuation amount of the noise signal to reduce the difference between the distribution of levels of noise signals in voice signals accumulated in the memory and the distribution of levels of noise signals in the training voice signals used for training the voice recognition model and may perform the operation of changing the normalization value of the speech signal to reduce the difference between the distribution of levels of speech signals in voice signals accumulated in the memory and the distribution of levels of speech signals in the training voice signals used for training the voice recognition model.

Meanwhile, when the parameter is changed, the processor of the AI server 200 may perform preprocessing for a voice signal based on the changed parameter, input the preprocessed voice signal to a voice recognition model, and acquire a voice recognition result.

In addition, when the parameter is changed, the characteristics of the voice signals accumulated in the memory may be deleted. In addition, the characteristics of the voice signals preprocessed based on the changed parameter may be newly stored in the memory.

In addition, the processor of the AI server 200 may change the changed parameter by using the distribution of voice signals newly accumulated in the memory.

In addition, the parameter may be continuously updated by repeating such a manner.

Meanwhile, when the parameter is changed excessively sensitively, voice recognition performance may also be changed sensitively, thereby causing inconvenience to the user.

Accordingly, the processor of the AI server 200 may change the parameter when the difference between the distribution of characteristics of the voice signals accumulated in the memory and the preset distribution is equal to or greater than a preset value.

In detail, the processor of the AI server 200 may change the parameter when the difference between the distribution of characteristics of the voice signals accumulated in the memory and the preset distribution is a first value greater than a preset value, and may perform preprocessing for the voice signal based on the changed parameter.

However, the processor of the AI server 200 may not change the parameter when the difference between the distribution of characteristics of the voice signals accumulated in the memory and the preset distribution is a second value less than the preset value, and may perform preprocessing for the voice signal based on the previous parameter.

An author of the voice recognition model assumes the use environment by the user and trains the voice recognition model by using training data matched with the assumed use environment.

For example, the author of the voice recognition model assumes a voice signal having a noise level ranging from 10 dB to 20 dB and a speech level ranging from 30 dB to 40 dB, trains the voice recognition model, and sets the parameter for preprocessing under such an assumption.

However, the real use environment of the electronic device may differ from the use environment assumed by the author of the voice recognition model. In detail, on the assumption that the electronic device 300 is used in a significantly noisy environment, and the user speaks louder to deliver the speech of the user in noisy environment, the voice signal having the noise level ranging from 20 dB to 30 dB and the speech level ranging from 40 dB to 50 dB may be received.

However, when the author of the voice recognition model performs the preprocessing by using the set parameter, the voice signal newly input into the voice recognition model has a difference in noise level and speech level from the voice signal previously input into the voice recognition model. Accordingly, the recognition performance of the voice recognition model may be deteriorated.

According to the present disclosure, the parameter is adjusted such that the distribution of the characteristic of the preprocessed voice signal is matched with the distribution of the characteristic of the voice signal assumed in training.

In other words, according to the present disclosure, the performance of the voice recognition model may be improved by matching the characteristic of the voice signal, which is preprocessed, with the characteristic of the training voice signal having used for training.

Figure 8:
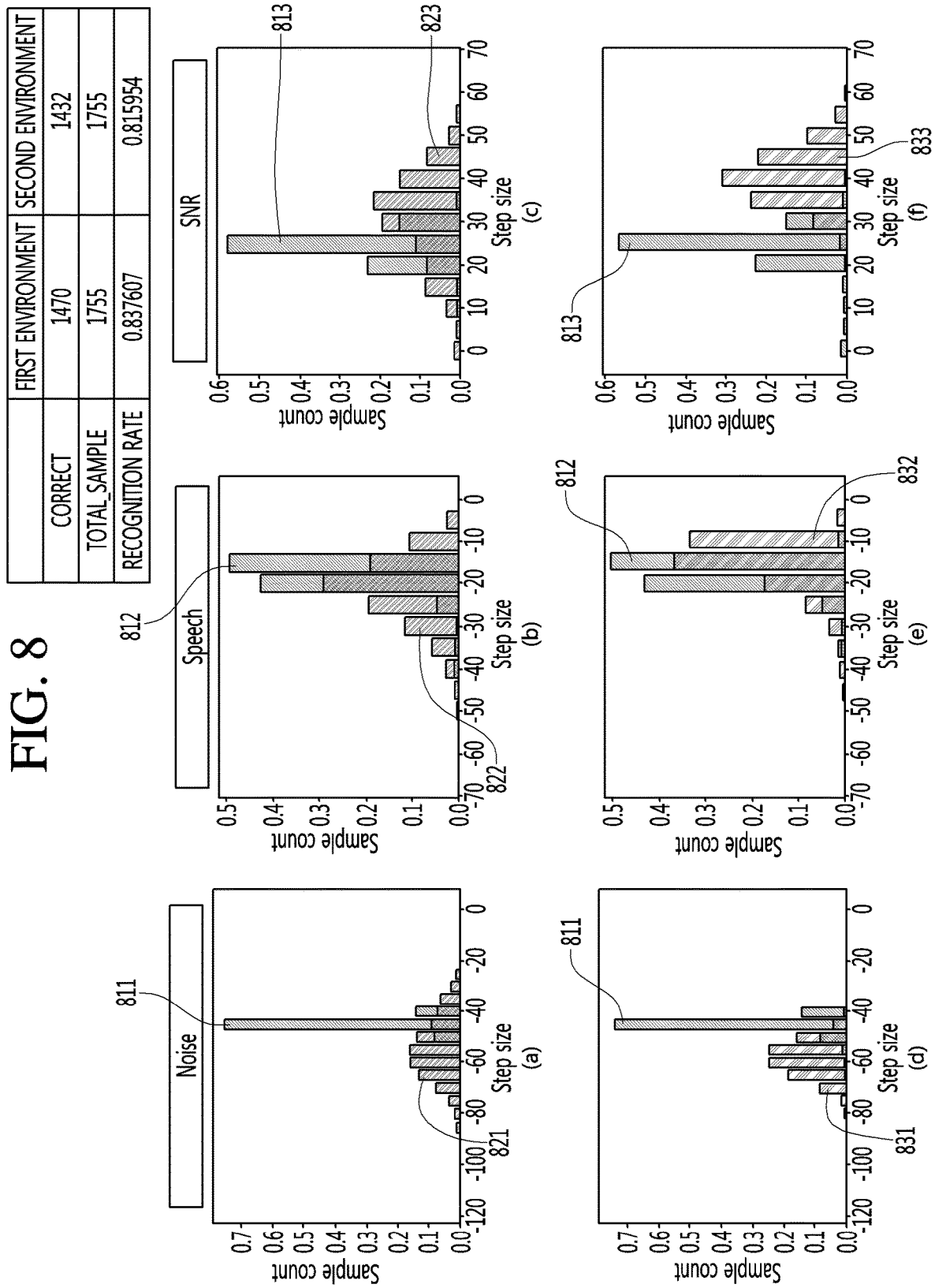
FIG. 8 is a view illustrating the distribution of the characteristic of the training voice signal and the distribution of the characteristic of the voice signal preprocessed in the real use environment.

FIG. 8 is a view illustrating the distribution of the characteristic of the training voice signal and the distribution of the characteristic of the voice signal preprocessed in the real use environment.

In each histogram, an X axis represents the level of the noise signal or the level of the speech signal. In addition, in each histogram, a Y axis represents a result obtained by counting the level of the noise signal or the level of the speech signal.

In addition, histograms "a", "b", and "c" illustrate characteristics (821: noise level, 822: speech level, 823: SNR) of voice signals, which are preprocessed, and characteristics (811: noise level, 812: speech level, or 813: SNR), when the voice signal received from the electronic device, which is used under the first environment, is preprocessed.

In addition, histograms "d", "e", and "8" illustrate characteristics (831: noise level, 832: speech level, 833: SNR) of voice signals, which are preprocessed, and the characteristics (811: noise level, 812: speech level, or 813: SNR) of the training voice signal, when the voice signal received from the electronic device, which is used under the second environment, is preprocessed.

When comparing histogram "a" with histogram "d", it may be recognized that the difference between the distribution 821 of noise levels of the preprocessed voice signals under the first environment and the distribution 811 of noise levels of the training voice signals is less than the difference between the distribution 831 of noise levels of the preprocessed voice signals under the second environment and the distribution 811 of noise levels of the training voice signals.

When comparing histogram "b" with histogram "e", it may be recognized that the difference between the distribution 822 of noise levels of the preprocessed voice signals under the first environment and the distribution 812 of noise levels of the training voice signals is less than the difference between the distribution 832 of noise levels of the preprocessed voice signals under the second environment and the distribution 812 of noise levels of the training voice signals.

The voice recognition performance under the first environment was 83.7607%, and the speech recognition performance under the second environment was 81.5954%.

In other words, the experimental result illustrated in FIG. 8 illustrates that the voice recognition performance is improved as the difference between the distribution of voice signals accumulated in the memory and the distribution of training voice signals used for training the voice recognition model is reduced.

Figure 9:
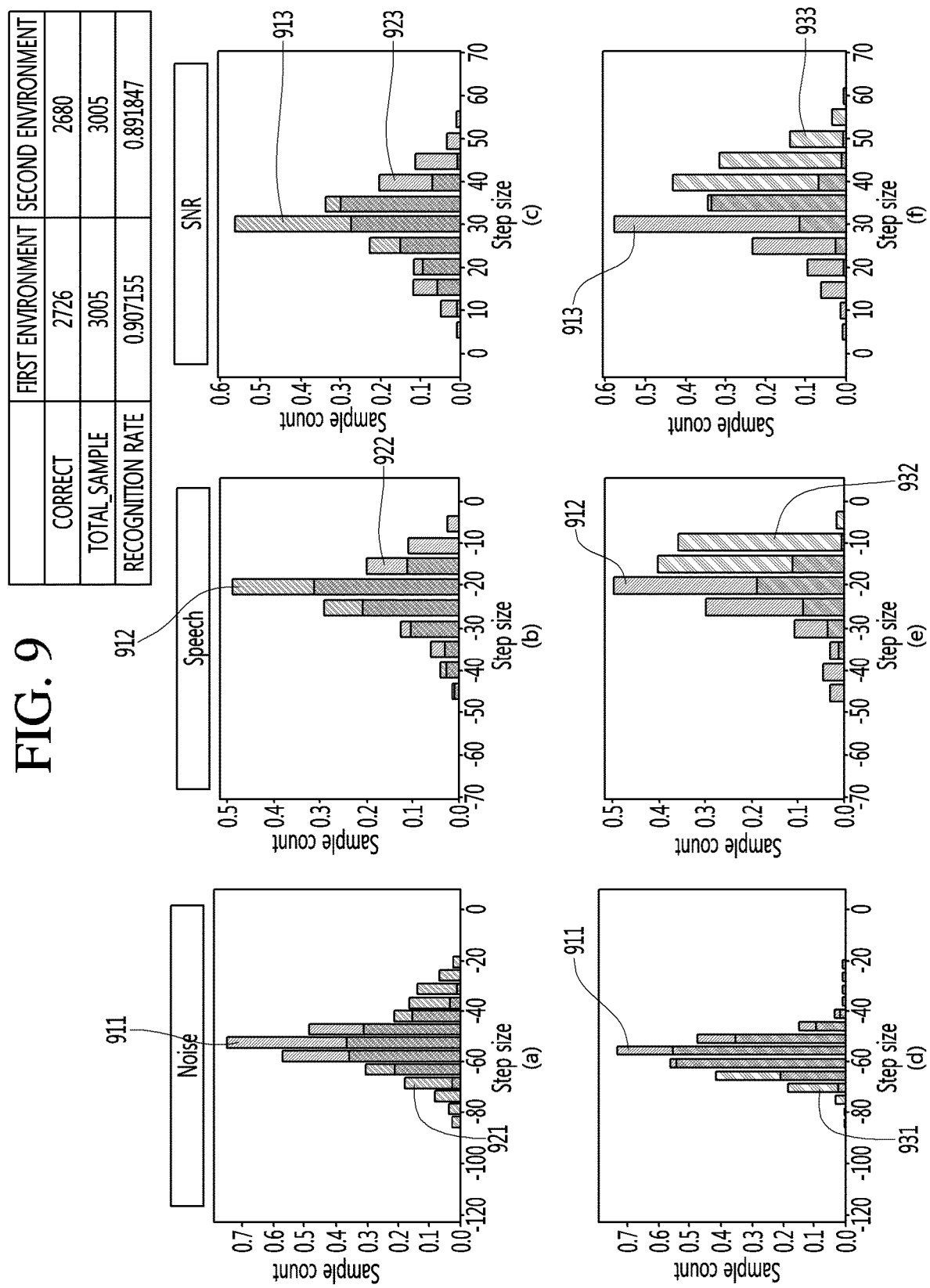
FIG. 9 is a view illustrating the distribution of the characteristic of the training voice signal and the distribution of the characteristic of the voice signal preprocessed in the real use environment.

FIG. 9 is a view illustrating the distribution of the characteristic of the training voice signal and the distribution of the characteristic of the voice signal preprocessed in the real use environment.

In addition, histograms "a", "b", and "c" illustrate characteristics (921: noise level, 922: speech level, and 923: SNR) of voice signals, which are preprocessed, and the characteristics (911: noise level, 912: speech level, and 913: SNR) of the training voice signals, when the voice signal received from the electronic device, which is used under the first environment, is preprocessed.

In addition, histograms "d", "e", and "f" illustrate characteristics (931: noise level, 932: speech level, and 933: SNR) of voice signals, which are preprocessed, and characteristics (911: noise level, 912: speech level, and 913: SNR) of training voice signals, when the voice signal received from the electronic device, which is used under the second environment, is preprocessed.

When comparing histogram "a" and histogram "d", it may be recognized that the difference between the distribution 921 of noise levels of the preprocessed voice signals under the first environment and the distribution 911 of noise levels of the training voice signals is less than the difference between the distribution 931 of noise levels of the preprocessed voice signals under the second environment and the distribution 911 of noise levels of the training voice signals.

When comparing histogram "b" and histogram "e", it may be recognized that the difference between the distribution 922 of noise levels of the preprocessed voice signals under the first environment and the distribution 912 of noise levels of the training voice signals is less than the difference between the distribution 932 of noise levels of the preprocessed voice signals under the second environment and the distribution 912 of noise levels of the training voice signals.

The voice recognition performance under the first environment represented 90.907155%, and the speech recognition performance under the second environment represented 89.1847%.

In other words, the experimental result illustrated in FIG. 9 illustrates that the voice recognition performance is improved as the difference between the distribution of voice signals accumulated in the memory and the distribution of training voice signals used for training the voice recognition model is reduced.

Figure 10:
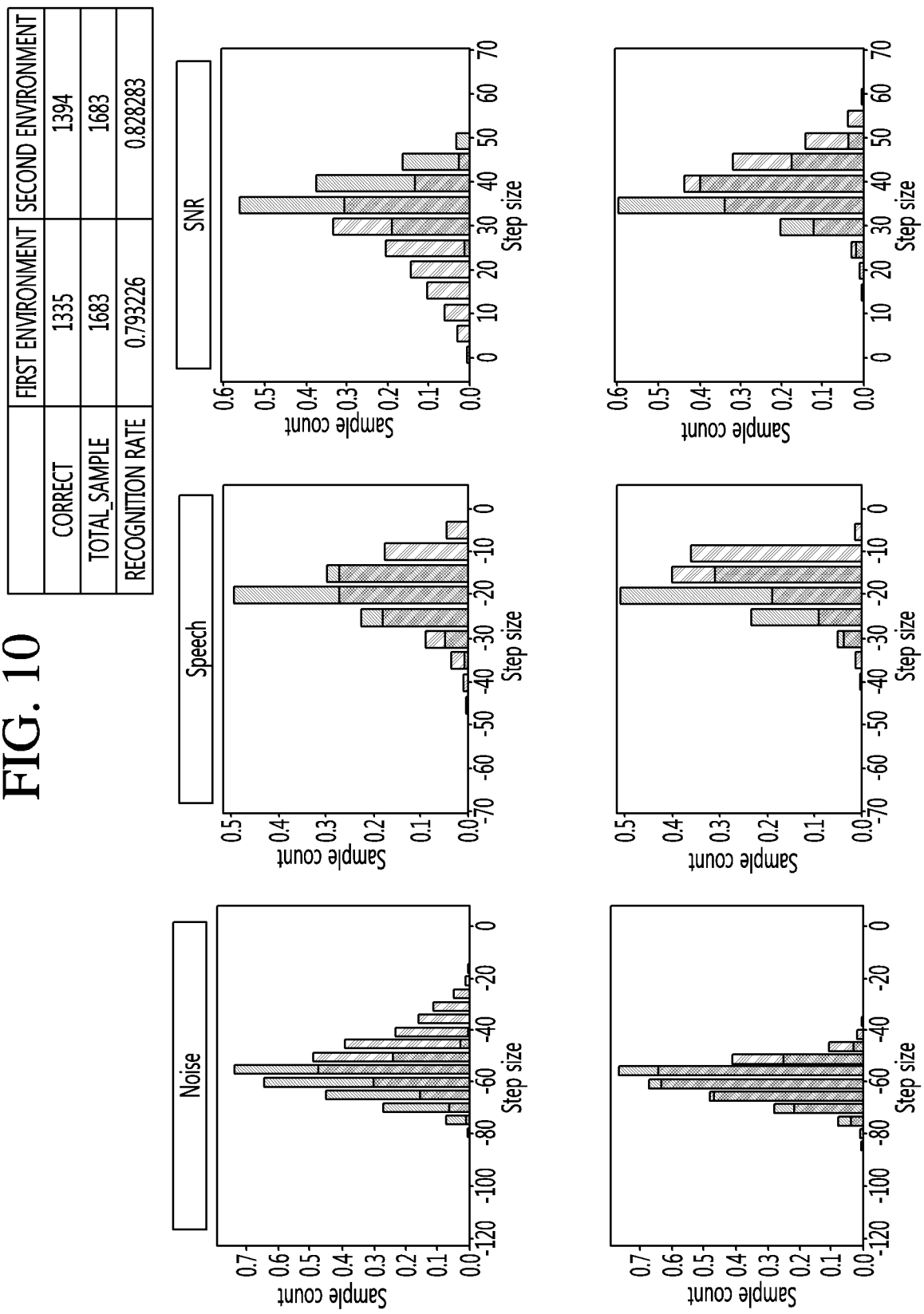
FIG. 10 is a view illustrating the distribution of the characteristic of the training voice signal and the distribution of the characteristic of the voice signal preprocessed in the real use environment.

FIG. 10 is a view illustrating the distribution of the characteristic of the training voice signal and the distribution of the characteristic of the voice signal preprocessed in the real use environment.

In addition, histograms "a", "b", and "c" illustrate characteristics of voice signals, which are preprocessed, when the voice signal received from the electronic: device, which is used under the first environment, is preprocessed, and characteristics of training voice signals.

In addition, histograms "d", "e", and "f" illustrate characteristics of voice signals, which are preprocessed, when the voice signal received from the electronic device, which is used under the second environment, is preprocessed, and characteristics of training voice signals.

When comparing histograms "a", "b", and "c" and histograms "d", "e", and "f", it may be recognized that the difference between the distribution of characteristics of the preprocessed voice signals under the first environment and the distribution of characteristics of the training voice signals is greater than the difference between the distribution of characteristics of the preprocessed voice signals under the second environment and the distribution of characteristics of the training voice signals.

The voice recognition performance under the first environment represented 79.3226%, and the speech recognition performance under the second environment represented 82.8283%.

Figure 11:
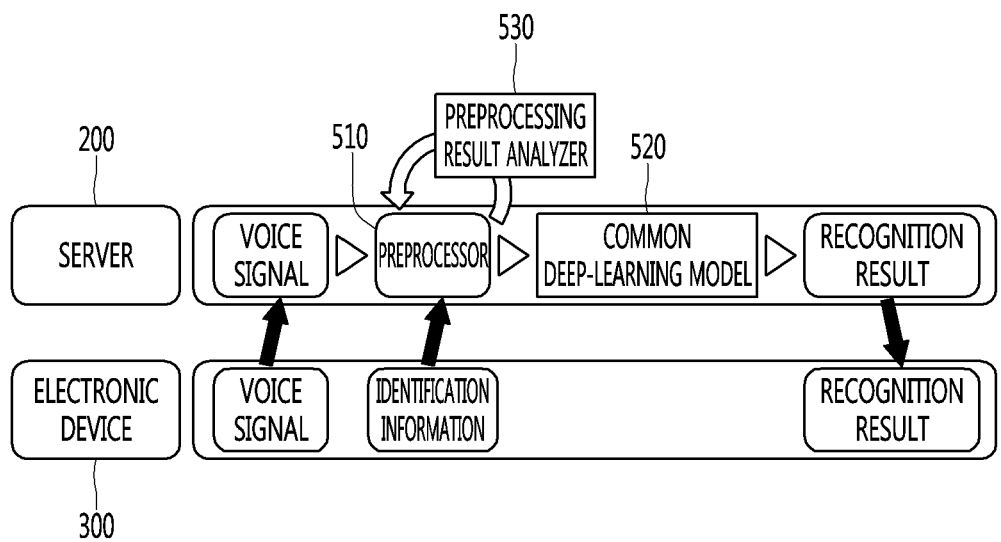
FIG. 11 is a view illustrating a method of operating an AI device, according to another embodiment of the present disclosure.

FIG. 11 is a view illustrating a method of operating an AI device, according to another embodiment of the present disclosure.

An AI system may include the AI server 200 and a plurality of electronic devices.

The plurality of electronic devices may communicate with the AI server 200.

In detail, the plurality of electronic devices may include a communication device, and the communication device may provide an interface for connecting the plurality of electronic devices to a wired/wireless network including an internet network. The communication device may transmit or receive data with the server through the connected network or another network linked to the connected network.

In addition, the plurality of electronic devices may receive a voice signal and transmit the voice signal to the AI server 200. In this case, the AI server 200 may perform preprocessing for a voice signal, input the preprocessed voice signal to a voice recognition model (common deep learning model), acquire a voice recognition result, and transmit the acquired voice recognition result to the plurality of electronic devices. In this case, the plurality of electronic devices may generate a control command corresponding to the voice recognition result to perform the control or may output the recognition result.

Meanwhile, the use environments of the plurality of electronic devices may be varied depending on the plurality of electronic devices. For example, in the case of voice recognition, the first electronic device may be used in an environment having a higher noise level and a higher speech level, and the second electronic device may be used in an environment having a lower noise level and a lower speech level, and a third electronic devices may be used in an environment having a higher noise level and a lower speech level.

Accordingly, each electronic device may be provided with a voice recognition service which is optimized, that is, customized for the use environment of each of electronic devices by applying different preprocessing parameters to each of the electronic devices.

In detail, the processor of the AI server 200 may receive a first voice signal through a voice acquisition device from the first electronic device 300. In this case, the processor of the AI server 200 may receive first identification information of the first electronic device 300 together with the first voice signal.

In this case, the processor of the AI server 200 may perform preprocessing for the first voice signal based on the first parameter corresponding to the first identification information, provide the preprocessed first voice signal to a voice recognition model (common deep learning model), acquire a voice recognition result, and transmit the acquired voice recognition result to the first electronic device 300.

In addition, the processor of the AI server 200 may store the characteristic of the preprocessed first voice signal into the memory. In addition, the processor of the AI server 200 may change the first parameter using the distribution of characteristics of the first voice signals accumulated in the memory.

Meanwhile, the processor of the AI server 200 may receive a second voice signal from the second electronic device 300 through a voice acquisition device. In this case, the processor of the AI server 200 may receive second identification information of the second electronic device together with the second voice signal.

In this case, the processor of the AI server 200 may perform preprocessing for the second voice signal based on the second parameter corresponding to the second identification information, provide the preprocessed second voice signal to a voice recognition model (common deep learning model), and acquires a voice recognition result. The acquired voice recognition result may be transmitted to the second electronic device.

In addition, the processor of the AI server 200 may store the characteristic of the preprocessed second voice signal into the memory. In addition, the processor of the AI server 200 may change the second parameter using the distribution of characteristics of the second voice signals accumulated in the memory.

Figure 12:
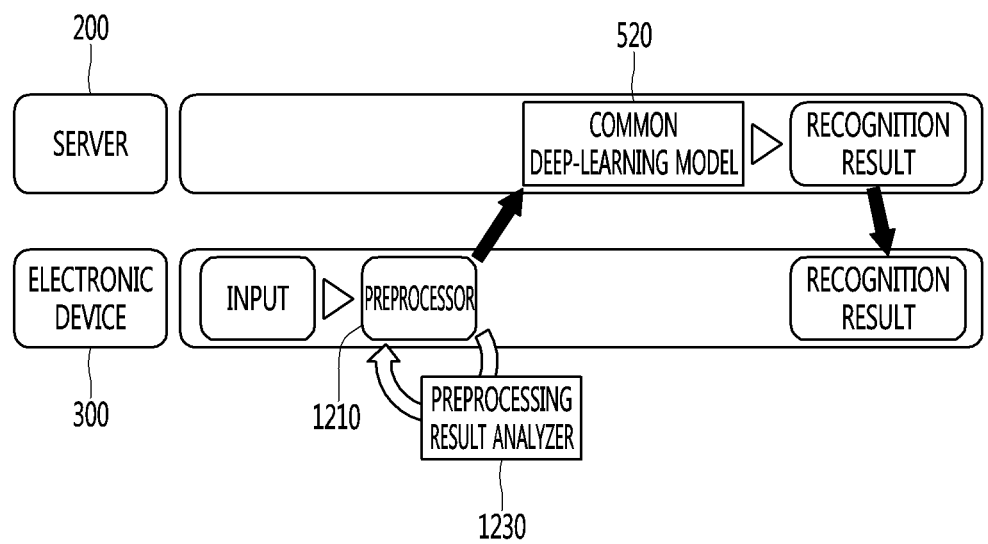
FIG. 12 is a view illustrating an AI device, according to another embodiment of the present disclosure.

FIG. 12 is a view illustrating the AI device, according to another embodiment of the present disclosure.

The above description has been made on the assumption that the AI device is the AI server 200. However, the present disclosure is not limited thereto, and the AI device may be the electronic device 300.

The following description will be made with reference to FIG. 12 while focusing on the difference from the description made with reference to FIGS. 1 to 11.

The electronic device 300 may include a preprocessing result analyzer 1230.

In this case, the preprocessing result analyzer 1230 may change a parameter set in a preprocessor 1210 by using distributions of characteristics of voice signals accumulated in the memory.

Meanwhile, the preprocessing result analyzer 1230 is a component of the processor, and the operation performed by the preprocessing result analyzer 530 may be an operation performed by the processor of the electronic device 300.

Meanwhile, the voice acquisition device may include an input device to receive a voice signal from a user. In this case, the input device may include a speaker.

The processor of the AI device 300 may perform preprocessing for the voice signal based on the parameter.

In addition, the processor of the electronic device 300 may provide the preprocessed voice signal to the voice recognition model.

In detail, the processor of the electronic device 300 may provide the preprocessed voice signal to a voice recognition model 500 mounted in the AI server 200 by transmitting the preprocessed voice signal to the AI server 200.

In this case, the AI server 200 may receive the preprocessed voice signal, and input the preprocessed voice signal into the voice recognition model 520. When the voice recognition model 520 outputs the voice recognition result, the AI server 200 may transmit the voice recognition result to the electronic device 300.

In addition, the processor of the electronic device 300 may acquire a voice recognition result.

In detail, the processor of the electronic device 300 may acquire the voice recognition result by receiving the voice recognition result from the AI server 200.

In this case, the processor of the electronic device 300 may output a voice recognition result or perform a function corresponding to the voice recognition result.

Meanwhile, the processor of the electronic device 300 may store the characteristics of the preprocessed voice signal in the memory of the electronic device 300 and change the parameter by using the distribution of the characteristics of the voice signals accumulated in the memory of the electronic device 300.

The disclosure may also be embodied as computer readable codes on a computer readable recording medium. The computer readable recording medium is any data storage device that may store data which may be thereafter read by a computer system. Examples of the computer readable recording medium include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. The computer may include the controller 180 of the mobile terminal. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. An artificial intelligence (AI) device comprising:
a memory configured to store data;
a voice acquisition interface configured to acquire a voice signal; and
a processor configured to perform preprocessing for the voice signal based on a parameter, provide the preprocessed voice signal to a voice recognition model to acquire a voice recognition result, store a characteristic of the preprocessed voice signal in the memory, and change the parameter using a distribution of characteristics of voice signals accumulated in the memory,
wherein the processor is configured to:
change the parameter to reduce a difference between the distribution of the characteristics of the voice signals accumulated in the memory and a preset distribution when the accumulated difference between the distribution of the characteristics of the voice signals and the preset distribution is equal to or greater than a preset value, and
perform preprocessing for the voice signal based on the changed parameter, and
wherein the preset distribution is a distribution of characteristics of training voice signals used for training the voice recognition model.

2. The AI device of claim 1, wherein the parameter includes:
at least one of an attenuation amount of a noise signal in the voice signal or a normalization value of a speech signal in the voice signal, and
wherein the processor is configured to:
perform, based on the parameter, at least one of an operation of lowering a level of the noise signal by the attenuation amount or adjusting a level of the speech signal to the normalization value.

3. The AI device of claim 1, wherein the characteristics of the voice signals accumulated in the memory include at least one of levels of noise signals in voice signals preprocessed based on the parameter or levels of speech signals in the voice signals preprocessed based on the parameter, and
wherein the processor is configured to:
acquire at least one of a distribution of levels of noise signals accumulated in the memory or a distribution of levels of speech signals accumulated in the memory.

4. The AI device of claim 1, wherein the processor is configured to:
acquire the distribution of the characteristics of the voice signals accumulated in the memory, when the preprocessing is performed a specific number of times or more.

5. The AI device of claim 1, wherein the parameter includes:
at least one of an attenuation amount of a noise signal in the voice signal or a normalization value of a speech signal in the voice signal, and
wherein the processor is configured to:
perform at least one of an operation of changing the attenuation amount of the noise signal or an operation of changing a normalization value of a speech signal, by using the distribution of the characteristics of the voice signals accumulated in the memory and the distribution of the characteristics of the training voice signals used for training the voice recognition model.

6. The AI device of claim 1, wherein the AI device is an AI server, and
wherein the voice acquisition interface includes a communication interface to receive the voice signal from an electronic device.

7. The AI device of claim 6, wherein the processor is configured to:
receive a first voice signal and first identification information from a first electronic device, perform preprocessing for the first voice signal based on a first parameter corresponding to the first identification information, provide the preprocessed first voice signal to the voice recognition model to acquire a first voice recognition result, transmit the first voice recognition result to the electronic device, store a characteristic of the preprocessed first voice signal in the memory, and change the first parameter using a distribution of characteristics of first voice signals accumulated in the memory, and
receive a second voice signal and second identification information from a second electronic device, perform preprocessing for the second voice signal based on a second parameter corresponding to the second identification information, provide the preprocessed second voice signal to the voice recognition model to acquire a second voice recognition result, transmit the second voice recognition result to the electronic device, store a characteristic of the preprocessed second voice signal in the memory, and change the second parameter using a distribution of characteristics of second voice signals accumulated in the memory.

8. The AI device of claim 1, wherein the AI device is an electronic device,
wherein the voice acquisition interface includes an input interface to receive a voice signal from a user, and
wherein the processor is configured to:
provide the preprocessed voice signal to the voice recognition model installed in an AI server by transmitting the preprocessed voice signal to the AI server, and
acquire the voice recognition model by receiving the voice recognition result from the AI server.

9. The AI device of claim 1, wherein the difference is reduced by an operation of changing the attenuation amount of the noise signal or an operation of changing a normalization value of a speech signal, by using the distribution of the characteristics of the voice signals accumulated in the memory and the distribution of the characteristics of the training voice signals used for training the voice recognition model.

* * * * *